United States Patent [19]

Silverman, Sr.

[11] Patent Number: 4,650,018
[45] Date of Patent: Mar. 17, 1987

[54] COMBINATION VEHICLE ASSEMBLY

[76] Inventor: Milton J. Silverman, Sr., 10441 Sierra Vista, La Mesa, Calif. 92041

[21] Appl. No.: 712,216

[22] Filed: Mar. 15, 1985

[51] Int. Cl.$^4$ ............................................. B62D 17/28
[52] U.S. Cl. .................................... 180/14.7; 180/53.7
[58] Field of Search ..................... 180/14.3, 14.4, 14.7, 180/14.1, 14.2, 53.7, 11

[56] References Cited

U.S. PATENT DOCUMENTS

| | | | |
|---|---|---|---|
| Re. 28,675 | 1/1976 | Hobbensiefken | 180/11 |
| 2,822,055 | 2/1958 | Ludowici | 180/11 |
| 3,035,654 | 5/1962 | Nuttal et al. | 180/14.4 |
| 3,215,219 | 11/1965 | Forsyth et al. | 180/14.3 |
| 3,353,618 | 11/1967 | Fisher | 180/14.4 |
| 3,583,510 | 6/1971 | Hastings | 180/11 |
| 3,842,927 | 10/1974 | Tantlinger | 180/11 |
| 3,899,039 | 8/1975 | McHugh | 180/11 |
| 3,908,398 | 9/1975 | Braunberger | 180/14.1 |
| 4,469,187 | 9/1984 | Hagin et al. | 180/14.2 |
| 4,473,127 | 9/1984 | Faust et al. | 180/14.1 |

*Primary Examiner*—John A. Pekar
*Attorney, Agent, or Firm*—Brown, Martin, Haller & Meador

[57] ABSTRACT

A combination vehicle assembly comprises a first vehicle, such as a mobile home, and second vehicle, such as a car, van, or truck, releasably connected to the first vehicle. The first vehicle has a steering mechanism for maneuvering the assembly and a drivable mechanism for propelling the assembly. The second vehicle is drivable independently of the first vehicle when they are separated and has a motor for providing driving power to the assembly. The connection between the vehicles comprises a releasable drive coupling between the second vehicle motor and the first vehicle propelling mechanism so that the first vehicle is driven by the second vehicle motor.

4 Claims, 3 Drawing Figures

COMBINATION VEHICLE ASSEMBLY

BACKGROUND OF THE INVENTION

The present invention relates to a combination vehicle assembly in which the motor of one vehicle provides the power to drive the assembly.

Such combination vehicle assemblies may, for example, comprise a house trailer or mobile home together with a truck or other automobile, or a farm implement such as a mower driven by a tractor or other vehicle.

In the area of recreational vehicles or homes on wheels, there are currently two basic arrangements. One is the motorless housetrailer or mobile home which is towed by a second vehicle such as a car or truck. The other is a motor home or self-powered mobile home. The former arrangement has the advantage that the towing vehicle is available for use independently of the mobile home on arrival at the destination. However, there will be some wear and tear on the towing vehicle's engine from towing the relatively heavy trailer, and the combination can tend to be quite unstable in heaving winds, for example.

The self-powered mobile home has the disadvantage that there is no smaller vehicle for local use on arrival at a destination. Thus, this type of mobile home is often seen towing an extra vehicle. Self-powered mobile homes are also relatively expensive, both in initial purchase and maintenance costs.

Other combinations of towed and towing vehicles are used in various fields. For example, farm implements such as ploughs and threshers are commonly towed by tractors. However, tractors are not suitable for extensive on-road use and the farmer must normally purchase other vehicles, such as cars or trucks for off the farm or leisure use. Automobiles or trucks cannot normally tow farm implements since the small tires of such vehicles provide insufficient traction. Thus, a farmer must purchase and maintain several vehicles, at considerable expense, in order to run a farm efficiently.

Other two or more combined vehicle assemblies are known. For example, articulated trucks and buses may have two or more trailer units articulated together. In U.S. Pat. No. 4,473,127 of Faust et al, a bus having three pivotally connected vehicle units is described. An engine in the tail vehicle drives all the drive axles of the vehicle units through a trail of articulated shafts. This arrangement leaves plenty of passenger space in the front units of the vehicle, and keeps the driver and passengers isolated from the motor to reduce vibration. Similarly, U.S. Pat. No. 3,899,039 of McHugh and U.S. Pat. No. 3,583,510 of Hastings both describe vehicle assemblies having forward steerable sections coupled to trailing power sections.

SUMMARY OF THE INVENTION

It is an object of this invention to provide a versatile combination vehicle assembly which provides the advantages of having a driven unit separate from the power or motor unit.

In the preferred embodiment of the present invention, two vehicles are provided which are releasably connected together. The first vehicle has a steering mechanism for steering the assembly and a drivable device for propelling the assembly, for example, wheels driven via an axle mechanism. The second vehicle is drivable independently of the first vehicle when they are separated and has its own steering mechanism and a motor for providing driving power. The motor of the second vehicle is releasably connected to the propelling device of the first vehicle to provide power for driving the assembly.

Normally, the first vehicle will have no motor, and in the preferred embodiment of the invention, the two vehicles are wheeled, with the first vehicle arranged to tow the second vehicle. Thus, the towing vehicle is driven by the towed vehicle.

The first vehicle will have drive wheels driven via an axle mechanism releasably connected to the second vehicle motor. A separate releasable towing connection such as a tow bar may be provided between the vehicles, or the towing connection may be integral with the drive connection between the vehicles. In the latter arrangement, the towing connection may, for example, comprise a telescoping sleeve surrounding a drive shaft projecting from the front of one of the vehicles which is releasably connectable to a drive shaft projecting from the rear of the other vehicle. The telescoping sleeve is suitably extended to surround the connected drive shafts and connect to a suitable tow connector on the other vehicle.

Thus the first, or leading vehicle tows the second, or trailing vehicle and at the same time, is driven by the trailing vehicle's motor. In one arrangement, according to the invention, the leading vehicle comprises a motorless mobile home such as a house trailer and the trailing vehicle comprises a suitable motor vehicle such as a car, van, truck, or four-wheel drive vehicle. This gives all the advantages of having a smaller vehicle available for use at the mobile home site, while at the same time, making it unnecessary for the smaller vehicle to tow the larger mobile home. It will be considerably less expensive than having both a motorized mobile home and a separate automobile or truck.

A control panel is provided in the leading vehicle for the driver of the assembly, and suitable releasable connections are provided to the trailing vehicle controls so that the motor can be controlled from the leading vehicle. In the preferred arrangement, the control panel will be the same as that found in a conventional motorized mobile home, and driving the combined assembly will be equivalent to driving a motorized mobile home. In addition to motor control connections between the vehicles, a braking connection may be provided to allow both vehicles to be braked simultaneously.

Other combination vehicle assemblies are possible according to the invention. For example, in a farming environment, the vehicle arrangement of this invention would allow most farm implements to be powered by a vehicle such as a truck which is also usable as a road vehicle. Thus, instead of needing farm implements, a tractor for towing the implements, powered implements for jobs where a tractor cannot be used, as well as a truck or other vehicle for on-road use, the farmer would only need non-powered farm implements and a truck. The motor of the truck will drive the farm implement, which has sufficiently large tires or treads to provide traction to tow the truck. The farm implement will be provided with a suitable transaxle arrangement for connection to the truck motor. The driver will normally be provided with a seat on the implement itself and controls for driving the assembly.

This arrangement has other advantages over the traditional tractor towing arrangement, since the farm implement is in front with the driver and when mowing or ploughing is carried out, for example, the driver can immediately see the work of the implement ahead of him and does not need to continually glance back to see the results of his work.

Although in the preferred embodiment of the invention, the combination vehicle assembly comprises a leading vehicle towing a trailing vehicle providing power to the assembly, the motor vehicle of the assembly need not necessarily be towed. Thus, in one arrangement, the first vehicle may comprise a propeller-driven barge, ferry, canal-boat or the like, with a second wheeled vehicle driven onto the boat and utilized to provide power to drive the propellers. Thus, the user of the boat has a wheeled vehicle for use at the destination and does not need to use a separate motor for driving the boat.

In another alternative arrangement, the driver may operate the assembly from the second, or trailing vehicle. One example where this arrangement would be useful is a military application where a vehicle is used to explode land mines. The leading vehicle would be a driverless vehicle relatively impervious to land mines, and the trailing vehicle would be releasably linked to the leading vehicle via drive shafts of length sufficient to isolate the driver from the danger of exploding land mine.

It is therefore an advantage of this invention that a combination vehicle assembly is provided in which one vehicle drives the entire assembly and in which the combination is relatively versatile.

BRIEF DESCRIPTION OF THE DRAWINGS

The above and other objects and advantages of the present invention will be apparent from the following detailed description of some preferred embodiments of the invention, taken in conjunction with the accompanying drawings, in which like reference numerals refer to like parts, and in which.

DESCRIPTION OF THE PREFERRED EMBODIMENTS

Figure 1:
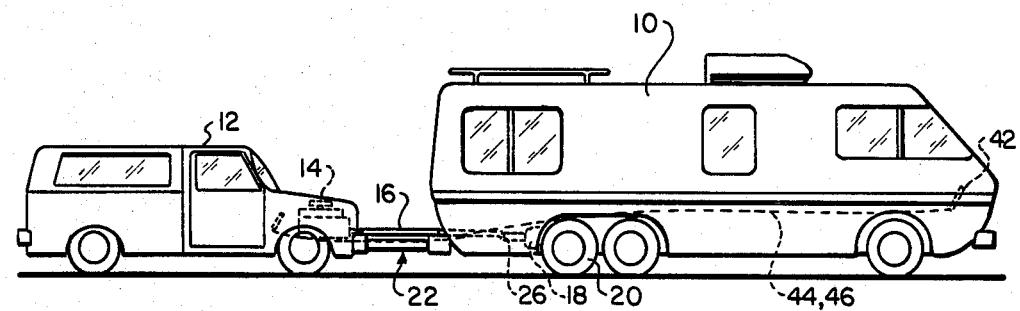
FIG. 1 is a side view of a combination vehicle assembly according to one embodiment of the invention.

The drawings illustrate one embodiment of a combination vehicle assembly according to the invention in which a leading vehicle 10 tows a trailing vehicle 12 and is itself driven by the motor 14 of the trailing vehicle. In the embodiment shown in the drawings, the leading vehicle 10 is a mobile home of the motorless type (although it may have a motor for independent driving in a modified assembly), and the trailing vehicle 12 is a truck. The truck 12 may be a truck of the four-wheel drive type, for example, or the trailing vehicle 12 may be an automobile. Any motor driven vehicle of sufficient power could clearly be used in this combination.

FIG. 1 shows a combination recreational vehicle assembly. However, a vehicle assembly of this type can also be used in a working environment. One example of this would be a case where the leading vehicle 10 is a farm implement such as a plough and the trailing vehicle 12 is a truck, so that the farmer has a vehicle 12 for both on and off road use and will not need a separate tractor. A military combination is possible where the leading vehicle is a mine-seeking vehicle. The operator would then drive the combination from the trailing vehicle, and the connection between the two vehicles would be sufficiently long to protect the driver from exploding mines. Clearly, there are various other possible combinations.

Figure 2:
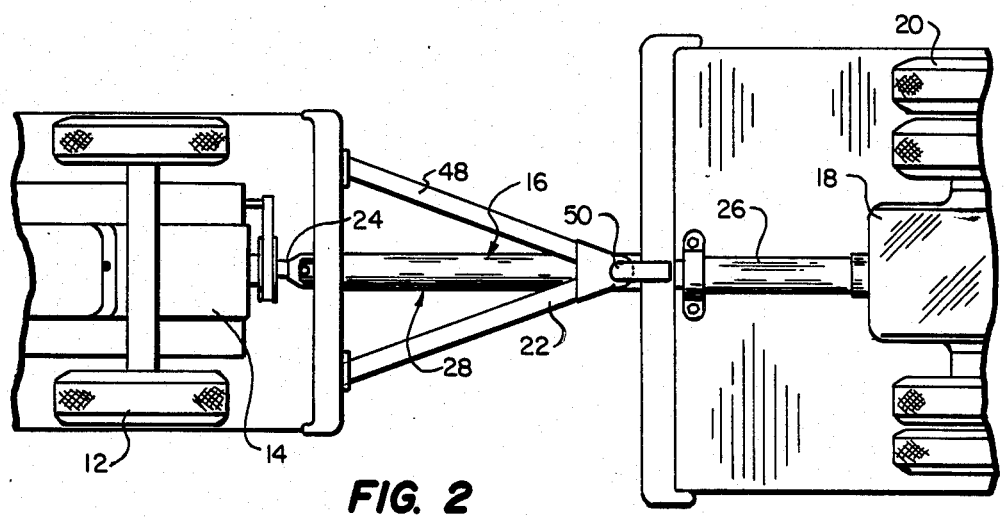
FIG. 2 is a bottom plan view of part of the assembly of FIG. 1 showing the towing and drive connections between the two vehicles.
Figure 3:
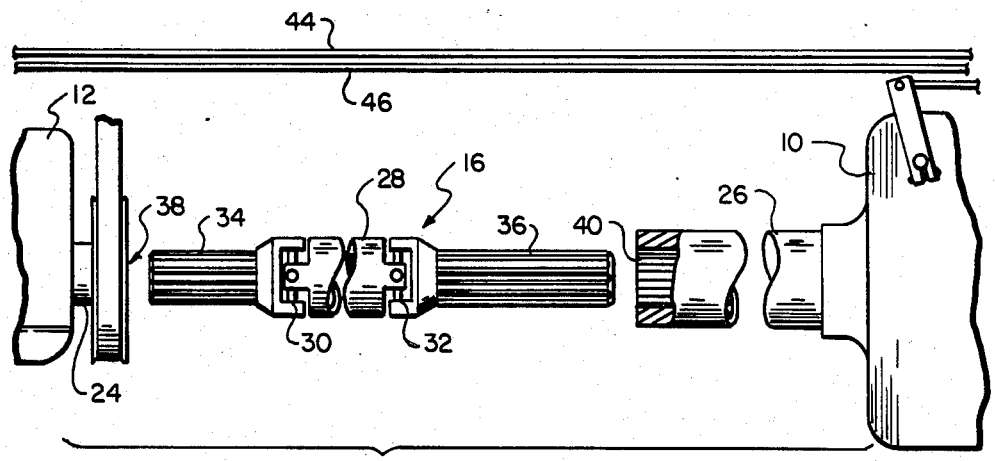
FIG. 3 is a side elevational view illustrating the releasable drive connection between the vehicles.

A releasable drive connection 16 is provided between the motor 14 of the trailing vehicle 12 and a transaxle 18 or other mechanism for providing power to the rear wheels 20 of the leading vehicle 10. This is best illustrated in FIGS. 2 and 3. A separate releasable towing connection 22 of the standard trailer tow bar type is provided between the two vehicles. The towing connection 22 may alternatively be provided in the form of a telescoping sleeve surrounding the drive connection 16 for extension and connection to a suitable link on one of the vehicles.

As shown in FIGS. 2 and 3, the drive connection 16 comprises a pinion 24 projecting from the motor 14 of the trailing vehicle, a shaft 26 projecting from the transaxle of the leading vehicle, and an articulated drive shaft 28 for releasably linking the pinion 24 to the shaft 26 of the transaxle 18. As shown in FIG. 3, the drive shaft 28 has universal joints 30, 32 at each end for permitting articulation between the two vehicles, and splined projections 34, 36 at each end for telescoping or sliding into corresponding splined bores 38, 40 in the pinion 24 and transaxle shaft 26, respectively.

As shown in FIG. 1, a control panel 42 is provided in the front of the leading vehicle 10 for a driver to control the assembly. The control panel will be equivalent to that found in a conventional motor driven mobile home and will include a steering wheel conventionally linked to the wheels of the leading vehicle for steering the assembly. Brakes are also provided for braking the wheels of the leading vehicle. Suitable releasable connections 44, 46 between the control panel 42 and the trailing vehicle are connected to the ignition and acceleration control of the trailing vehicle so that starting and acceleration of the trailing vehicle motor can be controlled from the leading vehicle. Connection 44 will comprise an electrical cable to connect the mobile home to the trailing vehicle ignition, and connection 46 may be a suitable mechanical link between the leading and trailing vehicle accelerator pedals, or a connection to the trailing vehicle gas line. A releasable connection (not shown) between the brakes of the leading vehicle and the brakes of the trailing vehicle may also be provided in a manner conventional in towing vehicles to allow both vehicles to be braked simultaneously.

In order to attach the two vehicles together such as shown in FIG. 1, the driver would first secure the connection 16 to one of the vehicles and then position the two vehicles one in front of the other as shown. The drive connection 16 may be releasable from both vehicles as shown in FIG. 3, or it may be permanently attached to either the pinion 24 or the transaxle shaft 26 by means of a pivotal connection allowing it to be raised up out of the way when the vehicles are not secured together. The drive connection 16 may be provided with telescoping parts (not shown) so that the trailing vehicle does not have to be precisely positioned to make the connection.

When the trailing vehicle has been driven into position and the splined projection 36 of drive connection 16 is secured or telescoped to the transaxle shaft 26, the other splined projection 34 will be secured in the pinion 24. The towing connection 22 is also made by securing tow bar 48 on the trailing vehicle to a suitable link or hook 50 on the leading vehicle. The towing connection may be the other way round in an alternative arrangement with the tow bar 48 being provided on the leading vehicle.

The trailing vehicle motor is then put in neutral so that its wheels are not directly driven. The driver will then sit in the front of the leading vehicle. The motor 14 is then switched on via connection 44, the transaxle 18 is shifted via standard automatic or manual gears on control panel 42 into a drive position, and the assembly can be driven in the same way as a conventional motor home.

On arrival at a recreational area, the two vehicles can be separated so that the smaller, trailing vehicle is available for local use and the mobile home can remain on-site. Thus, the best of both worlds is obtained since the smaller vehicle does not have to tow the much heavier mobile home directly, saving considerable wear and tear on the vehicle, and the mobile home can be without a motor which makes it considerably less expensive both in initial purchase and maintenance. The trailing motor vehicle in the combination is towed by the leading vehicle and is effectively free-wheeling, while the leading vehicle is driven by the trailing vehicle motor.

There are several other advantages apparent in this arrangement. One is that for long distance travel, the people in the mobile home, including the driver of the assembly, will enjoy a relatively quiet and vibration free environment, since they will be isolated from the motor. They will also be relatively safe from the danger of fire in the motor or fuel of the trailing vehicle, for example, in the event of an accident or malfunction of the motor. The cost of maintenance and repair of a standard automobile or truck is also normally less than that for a motor home.

The modifications to the mobile home and motor vehicle or truck necessary for the assembly will be relatively minor and the assembly may therefore be less expensive than the purchase of a separate motor home and smaller motor vehicle for short distance use. The motor of the vehicle or truck 12 needs only a slight modification to provide a drive pinion projecting from the front of the vehicle, and the mobile home is provided with a suitable control panel and connections for driving and controlling the trailing vehicle motor. The mobile home is also provided with a drive shaft for connection to a transaxle or similar device for driving the rear wheels of the mobile home. In other words, the mobile home will be substantially the same as the conventional motor home, only without the motor and with a drive shaft projecting from its rear.

When the assembly is to be maneuvered in reverse, the driver may simply move to the trailing vehicle driver's seat, shift the gears of the trailing vehicle into reverse, and drive the vehicle backwards with the trailing vehicle effectively "towing" the leading vehicle backwards. The leading vehicle transaxle may be shifted to neutral for this operation. Thus, the versatility of the combination vehicle assembly is apparent, since it can be driven by choice from either the leading or trailing vehicle and the trailing vehicle can also be driven separately.

As mentioned above, the combination vehicle assembly is not limited to a mobile home/truck or automobile combination, but various other combinations are possible. In farming, a single motor vehicle such as a truck can be used to power a variety of motorless farming implements provided with suitable transaxle mechanisms and driving control panels in a similar manner to the assembly shown in the drawings. The wheels or tracks of the farm implements would have sufficient traction to tow the truck on rough ground, and the truck would be available for on-road use. Thus, there would be no need for the farmer to purchase expensive self-powered implements or a tractor, which would provide important cost savings in relatively poor areas or developing countries.

In another alternative assembly, the motor vehicle 12 may be used to drive a propeller-driven barge, ferry, canal-boat, or the like. A suitable pinion projecting from the motor is engaged by a suitable drive shaft connection releasably linked to the boat propeller. Thus, the boat does not need its own motor and will be less expensive to purchase and maintain. A single motor vehicle such as a truck with a projecting pinion can then be used, for example, to drive various farm implements, to tow produce to a motorless ferry and to drive the ferry to a destination or collection point.

Thus, the various embodiments of the combination vehicle assembly described above have many possible recreational and working uses, provide great versatility at relatively low cost, and enable a single motor vehicle to be used in many possible ways to drive other vehicles.

Although a preferred embodiment of the invention has been described above by way of example, it will be understood by those skilled in the field that modifications may be made to the disclosed embodiments which are within the scope of the invention as defined by the appended claims.

What is claimed is:

1. A combination recreational vehicle assembly comprising:
    two vehicles of a different type, the vehicles comprising
    a first, leading vehicle having a steering mechanism for maneuvering the assembly and a drivable axle mechanism for propelling the assembly;
    an independently drivable second vehicle trailing the first vehicle comprising a standard road vehicle having a motor, an axle mechanism for connecting the motor to the wheels of the second vehicle for providing power to the wheels of the vehicle, gear means for selectively disconnecting the motor from the axle mechanism to place the vehicle in neutral, and steering means for maneuvering the second vehicle when driven independently of the first vehicle;
    a releasable mechanical drive connection between the second vehicle motor and the first vehicle axle mechanism to provide power for driving the assembly, the drive connection comprising a drive pinion projecting from the second vehicle motor to the front of the second vehicle, a drive shaft projecting from the first vehicle axle mechanism to the rear of the first vehicle, and an articulated drive shaft for releasably connecting said pinion to said axle mechanism drive shaft so as to provide power from said second vehicle motor to said first vehicle axle mechanism, the articulated drive shaft having universal joints at each end and telescopic splined linkage means for releasably connecting each universal joint to the drive pinion and the drive shaft projecting from the rear of the first vehicle, respectively; and releasable mechanical towing means separate from said mechanical drive connection linking said first vehicle to said second vehicle for towing the trailing vehicle from the leading vehicle with its motor disconnected from its axle mechanism and driving the axle mechanism of the leading vehicle;

said first vehicle further including control means for selectably controlling operation of the second vehicle motor from the first vehicle.

2. The combination of claim 1, wherein said leading vehicle comprises a mobile home and said trailing vehicle comprises a truck.

3. The combination of claim 2, wherein said truck comprises a four-wheel drive vehicle.

4. A method of powering a combination vehicle assembly comprising two vehicles of a different type, the vehicles comprising a leading, steerable vehicle and a trailing vehicle comprising a standard road vehicle having a motor, comprising the steps of:

providing a drive pinion projecting forwardly from the trailing vehicle motor;

connecting a shaft to an axle mechanism for driving the leading vehicle so that the shaft projects rearwardly from the leading vehicle;

releasably mechanically connecting the leading vehicle shaft to the trailing vehicle drive pinion so that the assembly is driven by the trailing vehicle motor;

disconnecting the trailing vehicle motor from the trailing vehicle axle mechanism so that the trailing vehicle wheels are unpowered; and releasably mechanically linking the trailing vehicle to the leading vehicle by means of a tow connection so that the trailing vehicle is unpowered and towed by the leading vehicle under the power of the trailing vehicle motor.

* * * * *